(12) United States Patent
Pinette

(10) Patent No.: US 7,406,980 B2
(45) Date of Patent: Aug. 5, 2008

(54) WATERWAY CONNECTION

(75) Inventor: Thomas Pinette, Indianapolis, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 196 days.

(21) Appl. No.: 11/214,229

(22) Filed: Aug. 29, 2005

(65) Prior Publication Data

US 2007/0044852 A1    Mar. 1, 2007

(51) Int. Cl.
*F16K 11/22*    (2006.01)
*F16K 27/00*    (2006.01)

(52) U.S. Cl. .................... 137/15.18; 137/375; 137/606; 264/277

(58) Field of Classification Search ............... 137/606 I, 137/375 X, 15.18, 375, 606; 264/271.1, 264/277 X, 277
See application file for complete search history.

(56) References Cited

U.S. PATENT DOCUMENTS

| | | | |
|---|---|---|---|
| 2,200,091 A * | 5/1940 | Kovach ........................ 137/375 |
| 2,219,471 A * | 10/1940 | Davis .......................... 137/375 |
| 2,546,327 A | 3/1951 | Young |
| 2,548,933 A | 4/1951 | Barnett |
| 2,781,786 A | 2/1957 | Young |
| 2,884,007 A | 4/1959 | Green |
| 3,229,710 A | 1/1966 | Keller, III |
| 3,422,849 A | 1/1969 | Manoogian |
| 3,448,768 A | 6/1969 | Keller, III |
| 3,505,098 A | 4/1970 | Miller et al. |
| 3,520,325 A | 7/1970 | Stuart |
| 3,580,289 A | 5/1971 | James et al. |
| 3,590,876 A | 7/1971 | Young |
| 3,600,723 A | 8/1971 | Mongerson et al. |
| 3,714,958 A | 2/1973 | Johnson et al. |
| 3,757,824 A | 9/1973 | Parkhurst et al. |
| 3,770,004 A | 11/1973 | Johnson et al. |
| 3,796,380 A | 3/1974 | Johnson et al. |
| 3,807,453 A | 4/1974 | Dom et al. |
| 3,854,493 A | 12/1974 | Farrell |
| 3,965,936 A | 6/1976 | Lyon |
| 3,989,787 A | 11/1976 | Scott, Jr. et al. |
| 3,998,240 A | 12/1976 | Liautaud |
| 4,026,328 A | 5/1977 | Nelson |
| 4,076,279 A | 2/1978 | Klotz et al. |
| 4,103,709 A | 8/1978 | Fischer |
| 4,130,136 A | 12/1978 | Garnier et al. |

(Continued)

FOREIGN PATENT DOCUMENTS

DE    10133041    1/2003

(Continued)

OTHER PUBLICATIONS

Noveon, Inc.; Processing with TempRite® PEX Ensures Quality Piping, www.tempritepex.com/processingInstallation/processing.asp, at least as early as Jun. 7, 2005, 2 pgs.

(Continued)

*Primary Examiner*—Stephen M Hepperle
(74) *Attorney, Agent, or Firm*—Baker & Daniels

(57) ABSTRACT

A coupler for a faucet is disclosed which couples a first waterway component and a second waterway component, the coupler being an overmold component.

25 Claims, 8 Drawing Sheets

U.S. PATENT DOCUMENTS

| | | | |
|---|---|---|---|
| 4,221,338 A | 9/1980 | Shames et al. | |
| 4,316,870 A | 2/1982 | Rowley | |
| 4,337,795 A | 7/1982 | Argyris et al. | |
| 4,356,574 A | 11/1982 | Johnson | |
| 4,357,957 A | 11/1982 | Bisonaya et al. | |
| 4,387,738 A | 6/1983 | Bisonaya et al. | |
| 4,415,389 A | 11/1983 | Medford et al. | |
| 4,446,084 A | 5/1984 | Rowley | |
| 4,453,567 A | 6/1984 | MacDonald | |
| 4,458,839 A | 7/1984 | MacDonald | |
| 4,484,600 A | 11/1984 | Peterson et al. | |
| 4,502,507 A | 3/1985 | Hayman | |
| 4,513,769 A | 4/1985 | Purcell | |
| 4,525,136 A | 6/1985 | Rowley | |
| 4,552,171 A | 11/1985 | Farrell et al. | |
| 4,577,835 A | 3/1986 | Holycross, Jr. | |
| 4,580,601 A | 4/1986 | Schlotman et al. | |
| 4,592,388 A | 6/1986 | Wilcox | |
| 4,607,659 A | 8/1986 | Cole | |
| 4,610,429 A | 9/1986 | Arnold et al. | |
| 4,626,005 A | 12/1986 | Stifter | |
| 4,635,673 A | 1/1987 | Gerdes | |
| 4,649,958 A | 3/1987 | Purcell | |
| 4,652,263 A | 3/1987 | Herweck et al. | |
| 4,664,423 A | 5/1987 | Rowley | |
| 4,667,987 A | 5/1987 | Knebel | |
| 4,687,025 A | 8/1987 | Kahle et al. | |
| 4,700,928 A | 10/1987 | Marty | |
| 4,708,172 A | 11/1987 | Riis | |
| 4,754,993 A | 7/1988 | Kraynick | |
| 4,760,871 A | 8/1988 | Vijay | |
| 4,762,143 A | 8/1988 | Botnick | |
| 4,773,348 A | 9/1988 | Rowley | |
| 4,783,303 A | 11/1988 | Imgram | |
| 4,803,033 A | 2/1989 | Rowley | |
| 4,838,304 A | 6/1989 | Knapp | |
| 4,853,164 A | 8/1989 | Kiang et al. | |
| 4,877,660 A | 10/1989 | Overbergh et al. | |
| 4,887,642 A | 12/1989 | Bernat | |
| 4,942,644 A | 7/1990 | Rowley | |
| 4,957,135 A | 9/1990 | Knapp | |
| 4,971,112 A | 11/1990 | Knapp | |
| 4,979,530 A | 12/1990 | Breda | |
| 5,001,008 A | 3/1991 | Tokita et al. | |
| 5,006,207 A | 4/1991 | Peterman et al. | |
| 5,027,851 A | 7/1991 | Drees et al. | |
| 5,053,097 A | 10/1991 | Johansson et al. | |
| 5,090,062 A | 2/1992 | Hochstrasser | |
| 5,095,554 A | 3/1992 | Gloor | |
| 5,100,565 A | 3/1992 | Fujiwara et al. | |
| 5,110,044 A | 5/1992 | Bergmann | |
| 5,127,814 A | 7/1992 | Johnson et al. | |
| 5,131,428 A | 7/1992 | Bory | |
| 5,148,837 A | 9/1992 | Ågren et al. | |
| 5,150,922 A | 9/1992 | Nakashiba et al. | |
| 5,219,185 A | 6/1993 | Oddenino | |
| 5,279,333 A | 1/1994 | Lawerence | |
| 5,366,253 A | 11/1994 | Nakashiba et al. | |
| 5,375,889 A | 12/1994 | Nakashiba et al. | |
| 5,397,102 A | 3/1995 | Kingman | |
| 5,417,242 A | 5/1995 | Goncze | |
| 5,493,873 A | 2/1996 | Donselman et al. | |
| 5,494,259 A | 2/1996 | Peterson | |
| 5,518,027 A | 5/1996 | Saiki et al. | |
| 5,527,503 A | 6/1996 | Rowley | |
| 5,553,935 A | 9/1996 | Burnham et al. | |
| 5,555,912 A | 9/1996 | Saadi et al. | |
| 5,558,128 A | 9/1996 | Pawelzik et al. | |
| 5,566,707 A | 10/1996 | Ching et al. | |
| 5,573,037 A | 11/1996 | Cole et al. | |
| 5,577,393 A | 11/1996 | Donselman et al. | |
| 5,579,808 A | 12/1996 | Mikol et al. | |
| 5,611,093 A | 3/1997 | Barnum et al. | |
| 5,615,709 A | 4/1997 | Knapp | |
| 5,622,210 A | 4/1997 | Crisman et al. | |
| 5,622,670 A | 4/1997 | Rowley | |
| 5,642,755 A | 7/1997 | Mark et al. | |
| 5,669,407 A | 9/1997 | Bailey | |
| 5,669,417 A | 9/1997 | Lian-Jie | |
| 5,669,595 A | 9/1997 | Bytheway | |
| 5,685,341 A | 11/1997 | Chrysler et al. | |
| 5,687,952 A | 11/1997 | Arnold et al. | |
| 5,695,094 A | 12/1997 | Burnham et al. | |
| 5,725,008 A | 3/1998 | Johnson | |
| 5,730,173 A | 3/1998 | Sponheimer | |
| 5,741,458 A | 4/1998 | Rowley | |
| 5,746,244 A | 5/1998 | Woolley, Sr. et al. | |
| 5,756,023 A | 5/1998 | Stachowiak | |
| 5,758,690 A | 6/1998 | Humpert | |
| 5,775,587 A | 7/1998 | Davis | |
| 5,803,120 A | 9/1998 | Bertoli | |
| 5,813,435 A | 9/1998 | Knapp | |
| 5,833,279 A | 11/1998 | Rowley | |
| 5,850,855 A | 12/1998 | Kerschbaumer et al. | |
| 5,857,489 A | 1/1999 | Chang | |
| 5,861,200 A | 1/1999 | Rowley | |
| 5,865,473 A | 2/1999 | Semchuchk et al. | |
| 5,875,809 A | 3/1999 | Barrom | |
| 5,893,387 A | 4/1999 | Paterson et al. | |
| 5,895,695 A | 4/1999 | Rowley | |
| 5,916,647 A | 6/1999 | Weinstein | |
| 5,924,451 A | 7/1999 | Kuo | |
| 5,927,333 A | 7/1999 | Grassberger | |
| 5,934,325 A | 8/1999 | Brattoli et al. | |
| 5,937,892 A | 8/1999 | Meisner et al. | |
| 5,944,225 A | 8/1999 | Kawolics | |
| 5,950,663 A | 9/1999 | Bloomfield | |
| 5,960,490 A | 10/1999 | Pitch | |
| 5,965,077 A | 10/1999 | Rowley et al. | |
| 5,975,143 A | 11/1999 | Järvenkylä et al. | |
| 5,979,489 A | 11/1999 | Pitch | |
| 6,013,382 A | 1/2000 | Coltrinari et al. | |
| 6,023,796 A | 2/2000 | Pitsch | |
| 6,029,860 A | 2/2000 | Donselman et al. | |
| 6,029,948 A * | 2/2000 | Shafer | 251/171 |
| 6,053,214 A | 4/2000 | Sjoberg et al. | |
| 6,062,251 A | 5/2000 | Pitsch | |
| 6,070,614 A | 6/2000 | Holzheimer et al. | |
| 6,070,916 A | 6/2000 | Rowley | |
| 6,073,972 A | 6/2000 | Rivera | |
| 6,079,447 A | 6/2000 | Holzheimer et al. | |
| 6,082,407 A | 7/2000 | Paterson et al. | |
| 6,082,780 A | 7/2000 | Rowley et al. | |
| 6,085,784 A | 7/2000 | Bloom et al. | |
| 6,116,884 A | 9/2000 | Rowley et al. | |
| 6,123,232 A | 9/2000 | Donselman et al. | |
| 6,131,600 A | 10/2000 | Chang | |
| 6,138,296 A | 10/2000 | Baker | |
| 6,155,297 A | 12/2000 | MacAusland et al. | |
| 6,161,230 A | 12/2000 | Pitsch | |
| 6,170,098 B1 | 1/2001 | Pitsch | |
| 6,177,516 B1 | 1/2001 | Hudak | |
| 6,202,686 B1 | 3/2001 | Pitsch et al. | |
| 6,227,464 B1 | 5/2001 | Allmendinger et al. | |
| 6,238,575 B1 | 5/2001 | Patil | |
| 6,256,810 B1 | 7/2001 | Baker | |
| 6,270,125 B1 | 8/2001 | Rowley et al. | |
| 6,287,501 B1 | 9/2001 | Rowley | |
| 6,293,336 B1 | 9/2001 | Emerick, Sr. et al. | |
| 6,296,017 B2 | 10/2001 | Kimizuka | |
| 6,305,407 B1 | 10/2001 | Selby | |
| 6,315,715 B1 | 11/2001 | Taylor et al. | |
| 6,328,059 B1 | 12/2001 | Testori et al. | |
| 6,334,466 B1 | 1/2002 | Jani et al. | |

| | | |
|---|---|---|
| 6,341,617 B1 | 1/2002 | Wilson |
| 6,349,733 B1 | 2/2002 | Smith |
| 6,378,790 B1 * | 4/2002 | Paterson et al. ............. 137/853 |
| 6,385,794 B1 | 5/2002 | Miedzius et al. |
| 6,464,266 B1 | 10/2002 | O'Neill et al. |
| 6,485,666 B1 | 11/2002 | Rowley |
| 6,557,907 B2 | 5/2003 | Rowley |
| 6,609,732 B1 | 8/2003 | Souvatzidis et al. |
| 6,635,334 B1 | 10/2003 | Jackson et al. |
| 6,732,543 B2 | 5/2004 | Jenkins, Jr. et al. |
| 6,770,376 B2 | 8/2004 | Chen |
| 6,770,384 B2 | 8/2004 | Chen |
| 6,783,160 B2 | 8/2004 | Rowley |
| 6,803,133 B2 | 10/2004 | Chen |
| 6,817,379 B2 | 11/2004 | Perla |
| 6,835,777 B2 | 12/2004 | Botros |
| 6,838,041 B2 | 1/2005 | Rowley |
| 6,848,719 B2 | 2/2005 | Rowley |
| 6,860,523 B2 | 3/2005 | O'Neill et al. |
| 6,860,524 B1 | 3/2005 | Rowley |
| 6,877,172 B2 | 4/2005 | Malek et al. |
| 6,894,115 B2 | 5/2005 | Botros |
| 6,902,210 B1 | 6/2005 | Rowley |
| 6,920,899 B2 | 7/2005 | Haenlein et al. |
| 6,959,736 B2 | 11/2005 | Järvenkylä |
| 6,962,168 B2 | 11/2005 | McDaniel et al. |
| 6,978,795 B2 | 12/2005 | Perrin |
| 7,111,640 B2 | 9/2006 | Rhodes |
| 7,118,138 B1 | 10/2006 | Rowley et al. |
| 7,225,828 B2 | 6/2007 | Giagni et al. |
| 7,231,936 B2 | 6/2007 | Chang |
| 2002/0100139 A1 | 8/2002 | Rowley |
| 2002/0167171 A1 | 11/2002 | Becker et al. |
| 2004/0007278 A1 | 1/2004 | Williams |
| 2004/0021120 A1 * | 2/2004 | Turnau, III et al. .......... 251/309 |
| 2004/0060608 A1 | 4/2004 | Angus |
| 2004/0117906 A1 | 6/2004 | Baker et al. |
| 2004/0150132 A1 | 8/2004 | Rowley |
| 2004/0176503 A1 | 9/2004 | Czayka et al. |
| 2005/0005989 A1 | 1/2005 | Roloff |
| 2005/0194051 A1 | 9/2005 | Pinette |
| 2006/0108705 A1 | 5/2006 | Rowley |
| 2006/0118185 A1 | 6/2006 | Nobili |
| 2006/0124183 A1 | 6/2006 | Kuo |
| 2006/0130908 A1 | 6/2006 | Marty et al. |
| 2006/0170134 A1 | 8/2006 | Rowley et al. |
| 2006/0202142 A1 | 9/2006 | Marty et al. |

FOREIGN PATENT DOCUMENTS

| | | |
|---|---|---|
| JP | 200132343 | 6/2001 |
| WO | WO 00/61831 | 10/2000 |
| WO | WO 02/25022 A1 | 3/2002 |
| WO | WO 2005/108829 | 11/2005 |

OTHER PUBLICATIONS

SpecialChem S.A., Silane Crosslinking Agents Center, Crosslinking Mechanism, www.specialchem4polymers.com/tc/silane-crosslinking-agents/index.aspx?id=mechanism, at least as early as Jun. 7, 2005, 2 pgs.
PPI Plastics Pipe Institute, Crosslinked Polyethylene (PEX) Tubing, TN-17/2001, www.plasticpipe.org/pdf/pubs/notes/tn17-01.pdf, Jun. 2001, 7 pgs.
Dadex Polydex, 2005, 1 pg.
Dadex Polydex—PPR Pipe System for Hot and Cold Water Supply and Distribution, 2005, 2 pgs.
Dow, Plastic Pipes Europe, Middle East & Africa, Hot and Cold Water Pipes, 2007, 1 pg.
Dow, Plastic Pipes Europe, Middle East, & Africa, Dowlex PE-RT, 2007, 2 pgs.
Kerox, Standard Cartridges, 2005, 3 pgs.
Kerox, Ceramic Mixing Cartridge, Conventional Single-Lever Type, Model K-28, undated, 2 pgs.
Ticona Engineering Polymers, Engineering Polymers for Innovative Applications catalog, Mar. 2006, 15 pgs.
PEX Association, What is PE-X?, undated, 7 pgs.

* cited by examiner

WATERWAY CONNECTION

BACKGROUND AND SUMMARY OF THE INVENTION

The present invention relates generally to a connection between a first waterway component and a second waterway component and, more particularly, to an overmold coupler which secures the first waterway component to the second waterway component in a faucet assembly.

Faucets are generally controlled by either a single handle which utilizes a mixing valve to proportion the flow of hot and cold water to a delivery spout, or dual-handles which utilize two individual valves to control the flow of hot and cold water. The valve bodies which house the respective valves are each typically connected to an upstream waterway through a conventional mechanical connection, such as mating threads. Further, each valve body is typically connected to a downstream waterway by brazing the valve bodies to the downstream waterway. In other examples the valve bodies and the downstream waterway are cast as a single component. Brazing requires additional time, assembly, and inspection. One of the problems with a brazing connection is that undesirable materials, such as harmful metals may be communicated from the brazing material into the water passing through the connection. Additionally, brazing requires a etching operation to be performed subsequent to the brazing operation.

In a exemplary embodiment of the present invention, a faucet for connection to a water supply having a hot water supply and a cold water supply is provided. The faucet comprising: a hot water inlet member having a hot water fluid inlet adapted to be coupled to the hot water supply, a hot water fluid outlet, and an internal waterway connecting the hot water fluid inlet to the hot water fluid outlet; a cold water inlet member having a cold water fluid inlet adapted to be coupled to the cold water supply, a cold water fluid outlet and an internal waterway connecting the cold water fluid inlet to the cold water fluid outlet; a waterway component having a first fluid inlet, a second fluid inlet, a fluid outlet and an internal waterway connecting the first fluid inlet, the second fluid inlet, and the fluid outlet; at least one coupler configured to maintain the position of the hot water inlet member relative to the waterway component and to maintain the position of the cold water inlet member relative to the waterway component, the at least one coupler being an overmold of at least a first portion of the hot water inlet member, a first portion of the cold water inlet member, and a first portion of the waterway component, the at least one coupler coupling the hot water inlet member and the waterway component such that the internal waterway of the hot water inlet member is in fluid communication with the internal waterway of the waterway component and coupling the cold water inlet member and the waterway component such that the internal waterway of the cold water inlet member is in fluid communication with the internal waterway of the waterway component. In an example, the at least one coupler includes a first overmold coupler which couples the hot water inlet member to the waterway component and a second overmold coupler which couples the cold water inlet member to the waterway component. In another example, the at least one coupler includes a first overmold coupler which couples the hot water inlet member to the waterway component and the cold water inlet member to the waterway component. In a variation the faucet further comprises a hot water upstream waterway coupled to the hot water inlet member, the hot water upstream waterway being positioned downstream from the hot water supply and upstream to the hot water inlet member, wherein the first overmold coupler further couples the hot water inlet member to the hot water upstream waterway. In another variation, the faucet further comprises a cold water upstream waterway coupled to the cold water inlet member, the cold water upstream waterway being positioned downstream from the cold water supply and upstream to the cold water inlet member, wherein the first overmold coupler further couples the cold water inlet member to the cold water upstream waterway. In a further example, the faucet further comprises a first user input device configured to control a flow rate of hot water exiting the fluid outlet of the hot water inlet member, the first user input device being positioned above the at least one coupler, and a second user input device configured to control a flow rate of cold water exiting the fluid outlet of the cold water inlet member, the second user input device being positioned above the at least one coupler.

In another exemplary embodiment of the present invention, a faucet is provided. The faucet comprising: a first waterway component of the faucet having an internal waterway; a second waterway component of the faucet having an internal waterway, the second component being positioned such that the internal waterway of the second waterway component is in fluid communication with the internal waterway of the first waterway component; a valve positioned within the first waterway component to control the flow rate of fluid through the first waterway component; a user input device coupled to the valve; and a coupler configured to maintain the position of the second waterway component relative to the first waterway component, the coupler being an overmold of at least a first portion of the first waterway component and a first portion of the second waterway component, wherein the coupler is spaced apart from the fluid being communicated by the internal waterways of the first waterway component and the second waterway component and wherein the user input device is external relative to the coupler. In an example, the coupler is made of a glass reinforced polypropylene. In another example, a seal is positioned between the first waterway component and the second waterway component. In a further example, the first waterway component and the second waterway component are housed in an escutcheon and the first user input device extends above the escutcheon.

In an exemplary method of the present invention, a method of assembling a faucet is provided. The method comprising the steps of: providing a first waterway component of the faucet having an internal waterway and a second waterway component of the faucet having an internal waterway; positioning the first waterway component and the second waterway component in a mold such that a fluid outlet of the internal waterway of the first waterway component is generally positioned proximate to a fluid inlet of the second waterway component; and molding a coupler over at least a portion of the first waterway component and at least a portion of the second waterway component, wherein the internal waterway of the first waterway component and the internal waterway of the second waterway component are in fluid communication and the coupler is spaced apart from the internal waterway of the first waterway component and the second waterway component. In an example, the method further comprises the step of positioning a valve within the first waterway component, the valve being configured to control the flow rate of fluid through the internal waterway of the first waterway component, the valve being positioned within the first waterway component prior to the step of molding a coupler. In one variation, the method further comprising the steps of: placing an escutcheon over the coupler; and coupling a first user input device to the valve, the first user input device being located above the escutcheon.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to the precise forms disclosed. Rather, the embodiments selected for description have been chosen to enable one skilled in the art to practice the invention. Although the disclosure is described in connection with water, it should be understood that additional types of fluids may be used.

Figure 1:
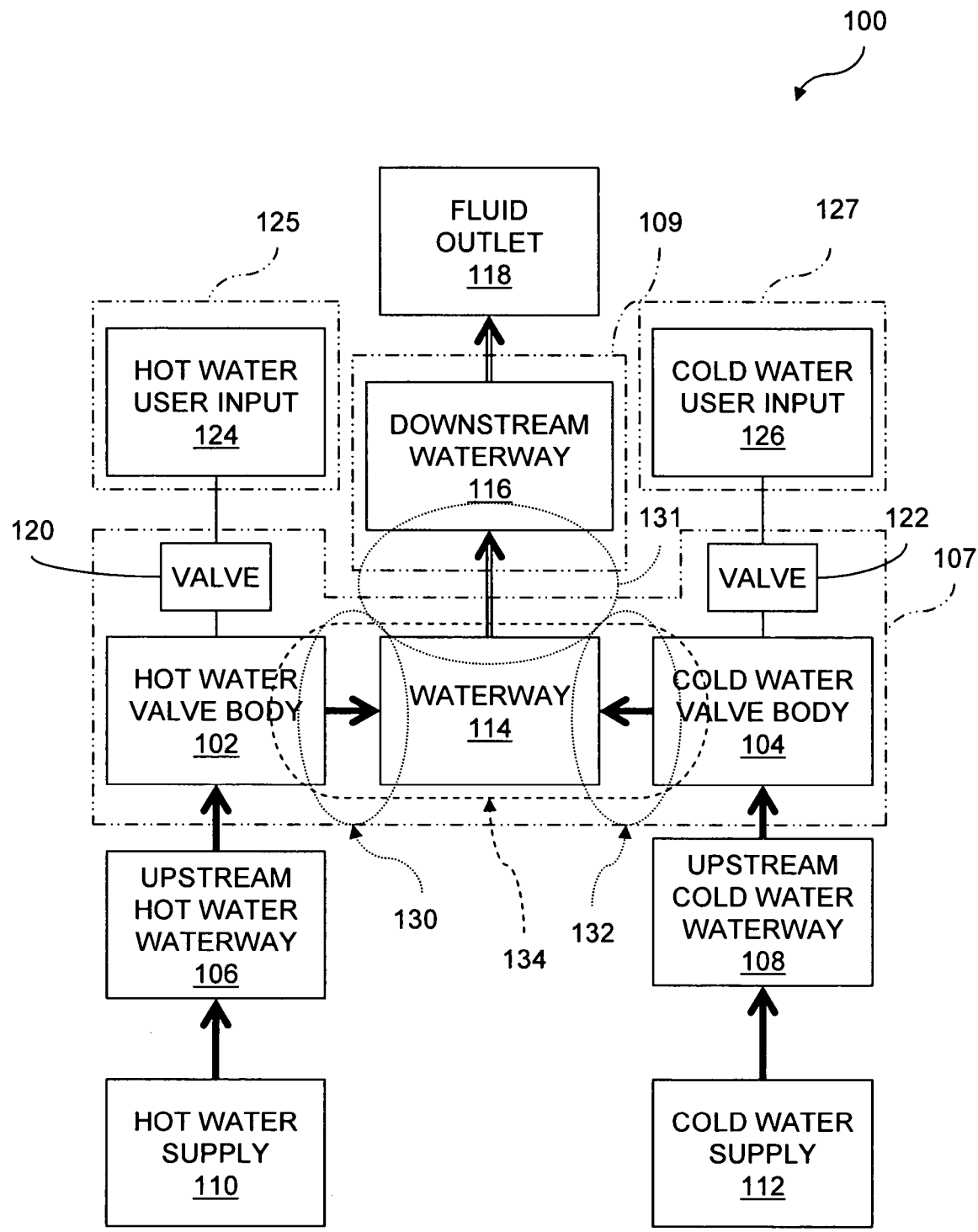
FIG. 1 is a is a diagrammatic view of a dual valve faucet having two valve bodies each housing a valve, the valve bodies each being connected to an adjacent waterway with one or more couplers.

Referring to FIG. 1, an illustrative embodiment of a faucet assembly 100 is shown. Faucet assembly 100 includes a hot water valve body 102 and a cold water valve body 104. Each of hot water valve body 102 and cold water valve body 104 are connected to an upstream waterway component 106, 108 which is in turn connected to a hot water supply 110 and a cold water supply 112, respectively An interior waterway in each of hot water valve body 102 and cold water valve body 104 is in fluid communication with hot water supply 110 and cold water supply 112, respectively, through a respective internal waterway in upstream waterway components 106, 108.

The internal waterway of each of hot water valve body 102 and cold water valve body 104, is in fluid communication with an internal waterway in a waterway component 114. As such, water from hot supply 110 and water from cold water supply 112 pass through hot water valve body 102 and cold water valve body 104, respectively, and into waterway component 114 where they are mixed and provided to an internal waterway in a downstream waterway component 116. Downstream waterway component 116, such as a spout, is in fluid communication with a fluid outlet 118, such as an aerator.

Hot water valve body 102 houses a valve 120 which is moveable between a first position wherein water from hot water supply 110 is in fluid communication with waterway component 114 and a second position wherein water from hot water supply 110 is not in fluid communication with waterway component 114. In one embodiment, valve 120 is a rotatable valve. The position of valve 120 is adjusted though a hot water user input 124, such as a handle 125. Handle 125 generally extends above escutcheon 107 of faucet 100.

Similarly, cold water valve body 104 houses a valve 122 which is moveable between a first position wherein water from cold water supply 112 is in fluid communication with waterway component 114 and a second position wherein water from cold water supply 112 is not in fluid communication with waterway component 114. In one embodiment, valve 122 is a rotatable valve. The position of valve 122 is adjusted though a cold water user input 126, such as a handle 127. Handle 127 generally extends above escutcheon 107 of faucet 100.

Suitable rotatable valves include the valves disclosed in U.S. Pat. Nos. 3,645,493; 4,453,567; 4,577,835; and 4,700,928, the disclosures of which are expressly incorporated by reference herein.

In one embodiment, hot water valve body 102 and cold water valve body 104 are connected to upstream hot water waterway component 106 and upstream cold water waterway component 108, respectively, through a conventional connection. Exemplary conventional connections include a mechanical connection, such as mating threaded portions with or without one or more seals. Hot water valve body 102 and cold water valve body 104 are each connected to waterway component 114 through an overmold coupler 130, 132, respectively.

In one embodiment, overmold couplers 130, 132 are formed by the steps of positioning each of hot water valve body 102, cold water valve body 104, and waterway component 114 relative to each other such that the respective waterways of each are in fluid communication. This grouping (hot water valve body 102, cold water valve body 104, and waterway component 114) is positioned within a mold (not shown) which is designed to hold the grouping in place. In another embodiment the grouping is created by the placement of hot water valve body 102, cold water valve body 104, and waterway component 114 in the mold. The mold is closed. Injection moldable material is introduced in the regions indicated by overmold couplers 130 and 132 in FIG. 1. The injection moldable material cools and overmold couplers 130 and 132 are formed. In one embodiment, the injection moldable material is a thermoplastic material. One exemplary material is a glass reinforced polypropylene. Other exemplary materials include injection moldable materials having a sufficient strength to maintain the position of the respective waterway components when in use with pressurized fluid.

Each connection coupled by a respective overmold coupler 130, 132 permits the transport of fluid there through. In one embodiment, an outlet of the internal waterway of hot water valve body 102 is positioned relative to the internal waterway of waterway component 114 so that fluid may flow from hot water valve body 102 into waterway component 114. In one embodiment, the positioning of hot water valve body 102 and waterway component 114 prevents the injection moldable material of overmold coupler 130 from contacting the fluid waterway created by hot water valve body 102 and waterway component 114. As such, overmold coupler 130 is spaced apart from the fluid transported in fluid waterway created by hot water valve body 102 and waterway component 114.

Similarly, in one embodiment, an outlet of the internal waterway of cold water valve body 104 is positioned relative to the internal waterway of waterway component 114 so that fluid may flow from cold water valve body 104 into waterway component 114. In one embodiment, the positioning of cold water valve body 104 and waterway component 114 prevents the injection moldable material of overmold coupler 132 from contacting the fluid waterway created by cold water valve body 104 and waterway component 114. As such, overmold coupler 132 is spaced apart from the fluid transported in fluid waterway created by cold water valve body 104 and waterway component 114.

In one embodiment, a single overmold coupler 134 is used in place of overmold couplers 130 and 132. Overmold coupler 134, like overmold couplers 130 and 132, is made from injection moldable material. Unlike overmold couplers 130 and 132, overmold coupler 134 spans at least two connections, illustratively the connection between hot water valve body 102 and waterway component 114 and the connection between cold water valve body 104 and waterway component 114. As such, overmold coupler 134 couples three components of the waterway assembly of faucet 100 together. In addition, by utilizing a contiguous coupler 134 additional strength is provided to the waterway assembly of faucet 100. The components coupled together by overmold coupler 134 are positioned so that the injection moldable material of overmold coupler 134 is prevented from contacting the fluid waterway created by the components coupled together. As such, overmold coupler 134 is spaced apart from the fluid transported in the fluid waterway created by the components coupled together by overmold coupler 134.

In the illustrated embodiment, hot water valve body 102, valve 120, cold water valve body 104, valve 122, waterway component 114, and the respective overmold coupler (either 130 and 132, or 134) are at least partially housed within an escutcheon 107. In another embodiment, an external surface of coupler 134 is visible to the operator. Similarly, downstream waterway component 116 is housed within a spout 109.

As used herein waterway assembly is used to indicate the respective overmold coupler or components and the components coupled together thereby. In an example, a first waterway assembly includes hot water valve body 102, waterway component 114, and overmold coupler 130. In another example, a second waterway assembly includes cold water valve body 104, waterway component 114, and overmold coupler 132. In a further example, a third waterway assembly includes hot water valve body 102, cold water valve body 104, waterway component 114, and overmold coupler 134.

In one embodiment, an overmold coupler, similar to overmold coupler 130 couples hot water valve body 102 and upstream hot water waterway component 106. In another embodiment, an overmold coupler, similar to overmold coupler 132 couples cold water valve body 104 and upstream cold water waterway component 108. In still a further embodiment, overmold coupler 134 couples together the following pairs of components: (1) hot water valve body 102 and upstream hot water waterway component 106, (2) hot water valve body 102 and waterway component 114, (3) cold water valve body 104 and upstream cold water waterway component 108, and (4) cold water valve body 104 and waterway component 114. In one example, upstream hot water waterway component 106 and upstream cold water waterway component 108 each include a flexible tubing portion which is at least partially located outside of overmold coupler 134. As such, during installation of faucet 100, the waterway assembly including overmold coupler 134 may be positioned relative to the sink (not shown) and the only fluid connections required for installation would be between the flexible tubing of upstream hot water waterway component 106 and hot water supply 110, such as the hot water isolation valve, and between the flexible tubing of the upstream cold water waterway component 108 and the cold water supply 112, such as the cold water isolation valve.

In one embodiment, an overmold coupler 131, similar to overmold coupler 130 couples waterway component 114 and downstream waterway component 116. In another embodiment, overmold coupler 134 couples together the following pairs of components: (1) hot water valve body 102 and waterway component 114, (2) cold water valve body 104 and waterway component 114, and (3) waterway component 114 and downstream waterway component 116. In one example, wherein downstream waterway component 116 corresponds generally to a spout, overmold coupler 134 extends generally down to the aerator associated with the spout. In another embodiment, downstream waterway component 116 and waterway 114 are a single component, such as an injection molded component.

In another embodiment, overmold coupler 134 couples together the following pairs of components: (1) hot water valve body 102 and upstream hot water waterway component 106, (2) hot water valve body 102 and waterway component 114, (3) cold water valve body 104 and upstream cold water waterway component 108, (4) cold water valve body 104 and waterway component 114; and (5) waterway component 114 and downstream waterway component 116. As such, each connection of faucet 100, except for the connections between faucet 100 and the respective hot water supply 110 and cold water supply 112 are maintained by overmold coupler 134.

Although the above discussion has illustrated a single upstream hot water waterway component 106, a single upstream cold water waterway component 108, and a single downstream water 116, it should be understood that the use of one or more overmold couplers may be extended to multiple upstream hot water waterways 106, multiple upstream cold water waterways 108, and/or multiple downstream waterways 116. Further, waterway component 114 may be formed of multiple waterways which are coupled together through the use of one or more overmold couplers.

Figure 2:
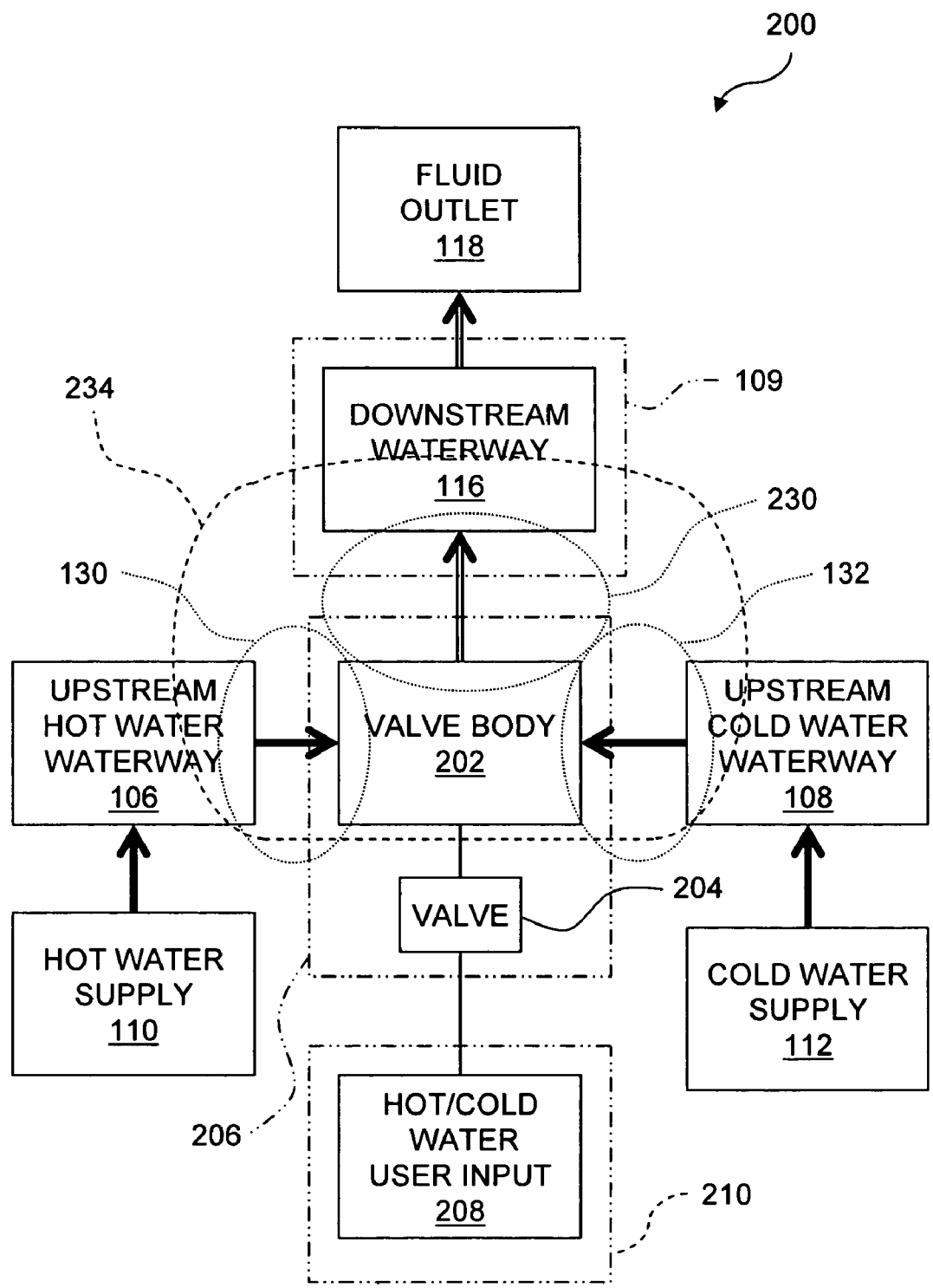
FIG. 2 is a is a diagrammatic view of a single valve faucet having a valve body housing a valve, the valve body being connected to an adjacent waterway with one or more couplers.

Referring to FIG. 2, another exemplary faucet 200 is illustrated. Faucet 200 is similar to faucet 100 expect that a single valve body 202 is connected to both upstream hot water waterway component 106 and upstream cold water waterway component 108 and downstream waterway component 116. Valve body 202 houses a valve 204 which controls the flow rate of both the hot water and the cold water that enters valve body 202. The hot water and the cold water are at least partially mixed within valve body 202. In one embodiment, valve 204 is a ball valve. Exemplary valves are disclosed in U.S. Pat. No. 6,920,899 and U.S. Provisional Application Ser. No. 60/662,106, the disclosures both of which are expressly incorporated by reference herein.

Valve 204 is actuatable by a hot/cold water user input device 208. In one example, user input device 208 includes a handle 210. In one embodiment, valve 204 and valve body 202 are generally covered by an escutcheon 206. In another embodiment, an external surface of coupler 234 is visible to the operator. User input device 208 generally extends beyond escutcheon 206. Illustratively, user input device 208 is shown below escutcheon 206. In one embodiment, user input device 208 is positioned above escutcheon 206.

Each of the following connections may be coupled by a respective overmold coupler: (1) upstream hot water waterway component 106 and valve body 202 are illustratively coupled by overmold coupler 130; (2) upstream cold water waterway component 108 and valve body 202 are illustratively coupled by overmold coupler 132; and (3) valve body 202 and downstream waterway component 116 are coupled together by overmold coupler 230. Similar to faucet 100, one or more of the overmold couplers may be combined in a single overmold coupler. Illustratively overmold couplers 130, 132, and 230 may be replaced with a single overmold coupler 234. In one embodiment, the respective overmold couplers provide structural support for faucet 200 in addition to maintaining the connections between the various components.

Figure 3:
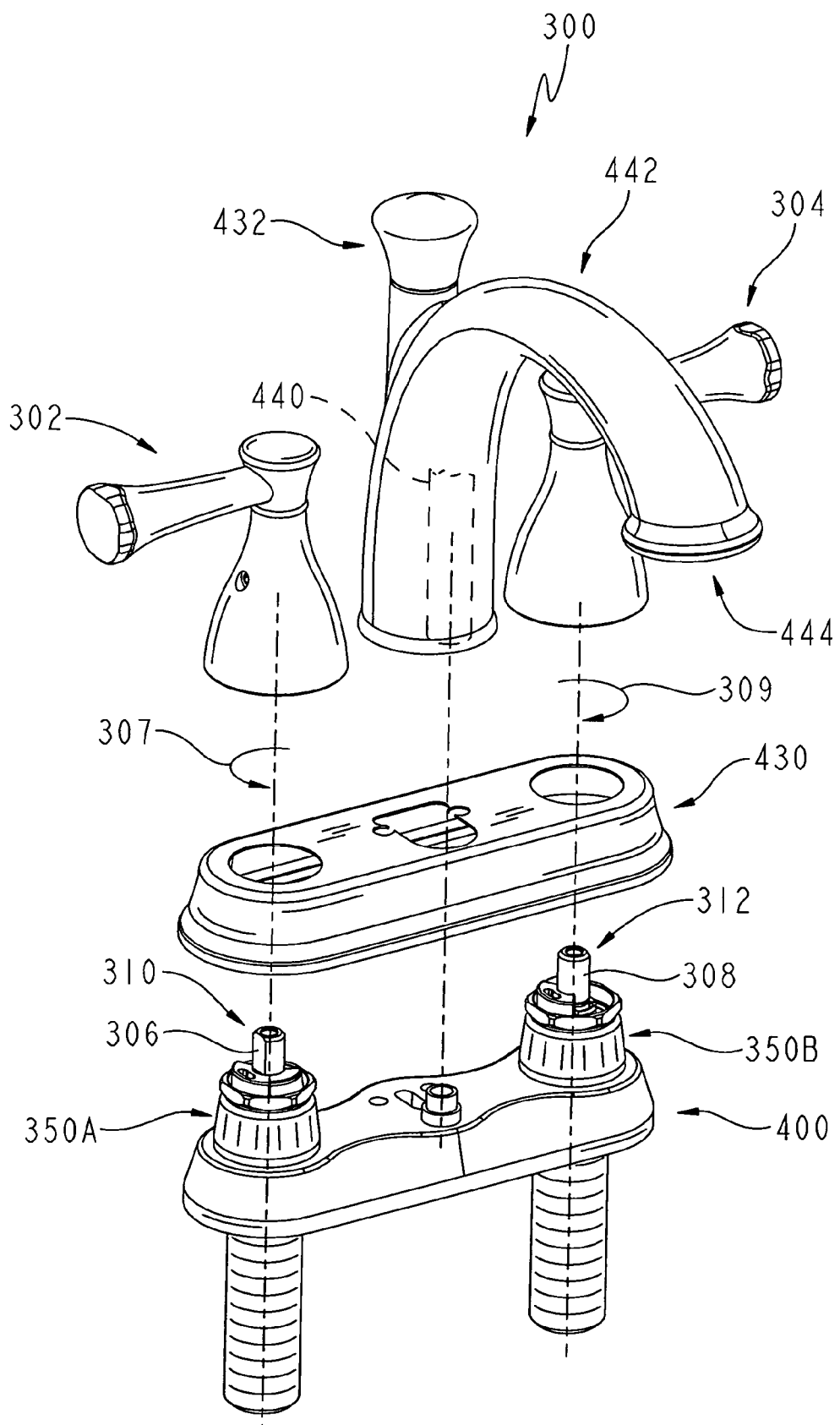
FIG. 3 is an exemplary dual valve faucet assembly including a lower assembly, an escutcheon, user handles coupled to respective valves of the lower assembly, and a spout in fluid communication with a waterway of the lower assembly.

Referring to FIGS. 3-9, a faucet 300 is shown. Referring to FIG. 3, faucet 300 is a dual handle faucet having a first handle 302 configured to be actuatable by a user to control the flow rate of hot water and a second handle 304 configured be actuatable by a user to control the flow rate of cold water. Each of handles 302 and 304 is coupled to a respective valve stem 306, 308 of a hot water valve 310 and a cold water valve 312.

Figure 6:
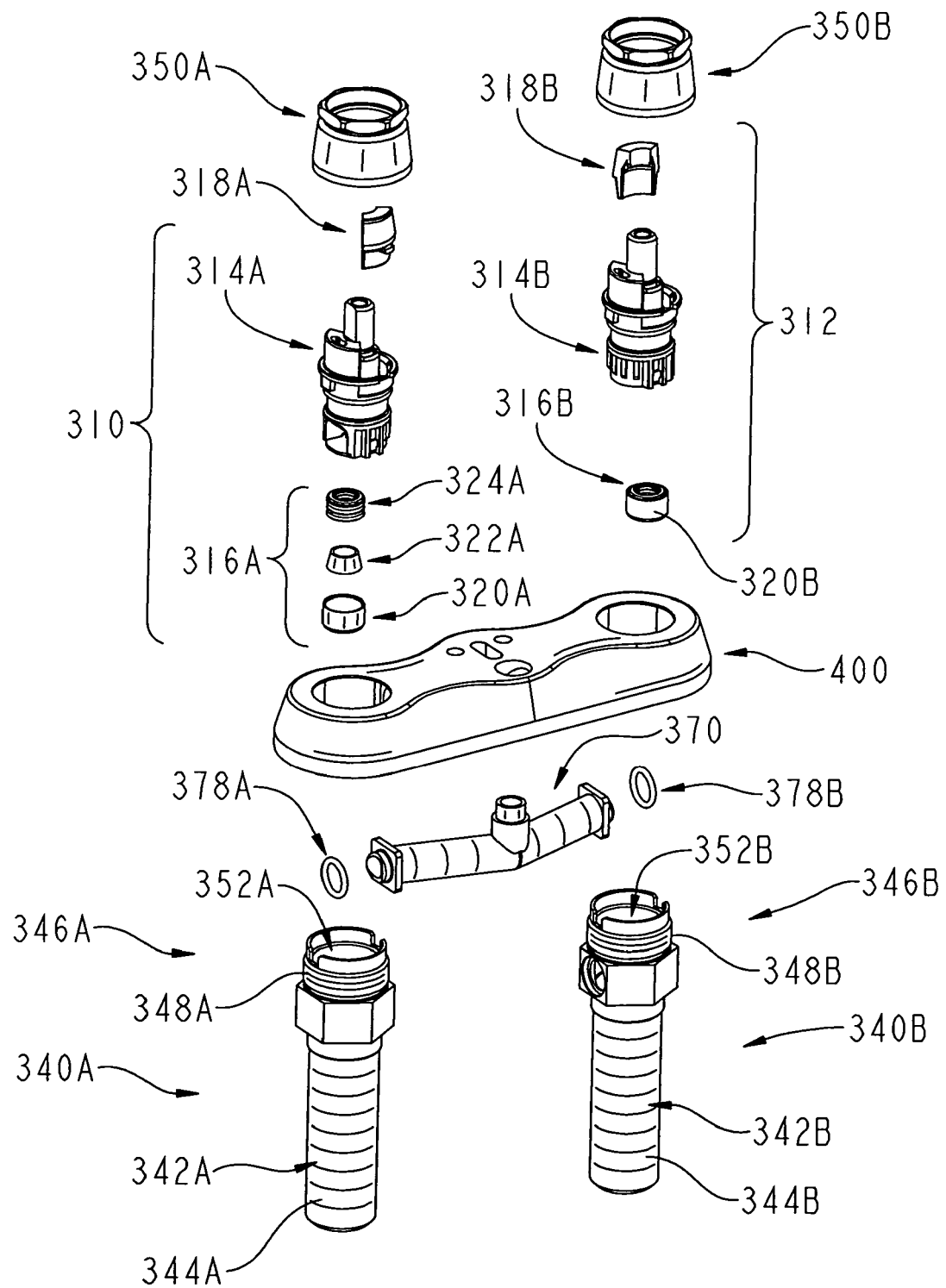
FIG. 6 is an exploded perspective view of the lower assembly of FIG. 3.

Valves 310 and 312 are shown as rotatable cartridge valves. Exemplary cartridge valves are disclosed in U.S. Pat. Nos. 3,645,493; 4,453,567; 4,577,835; and 4,700,928, the disclosures of which are expressly incorporated by reference herein. Referring to FIG. 6 each valve 310, 312 includes a respective valve cartridge 314A, 314B, seal assembly 316A, 316B, and stop 318A, 318B. Stops 318A, 318B are configured to interact with cartridges 314A, 314B to limit the rotation of the respective valve stem 306, 308. In one embodiment, stop 318A is positioned so that valve stem 306 (and hence handle 302) is moveable between the position shown in FIG. 3 and approximately 90° in direction 307 and stop 318B is positioned so that valve stem 308 (and hence handle 304) is moveable between the position shown in FIG. 3 and approximately 90° in direction 309.

Each of seal assemblies 316A, 316B include a sleeve 320, a spring 322, and a seat 324. As explained below, seal assemblies 316A, 316B interact with respective valve cartridges 314A, 314B to regulate the flow of fluid through respective valves 310, 312. The following discussion is generally related to the assembly and operation of valve 310 relative to a valve body 340A. However, it is also applicable to the assembly and operation of valve 312 relative to valve body 340B.

Figure 5:
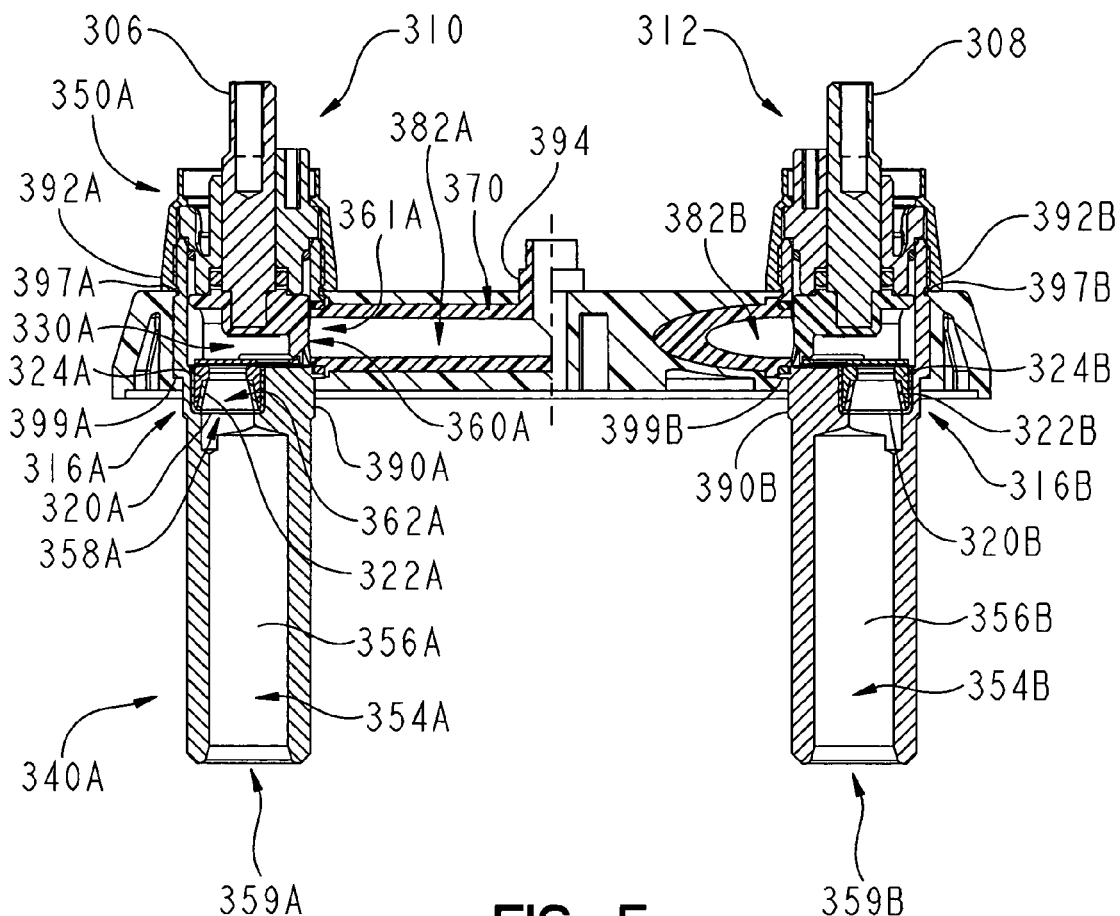
FIG. 5 is a sectional view of the lower assembly taken along lines 5-5 of FIG. 4.
Figure 7:
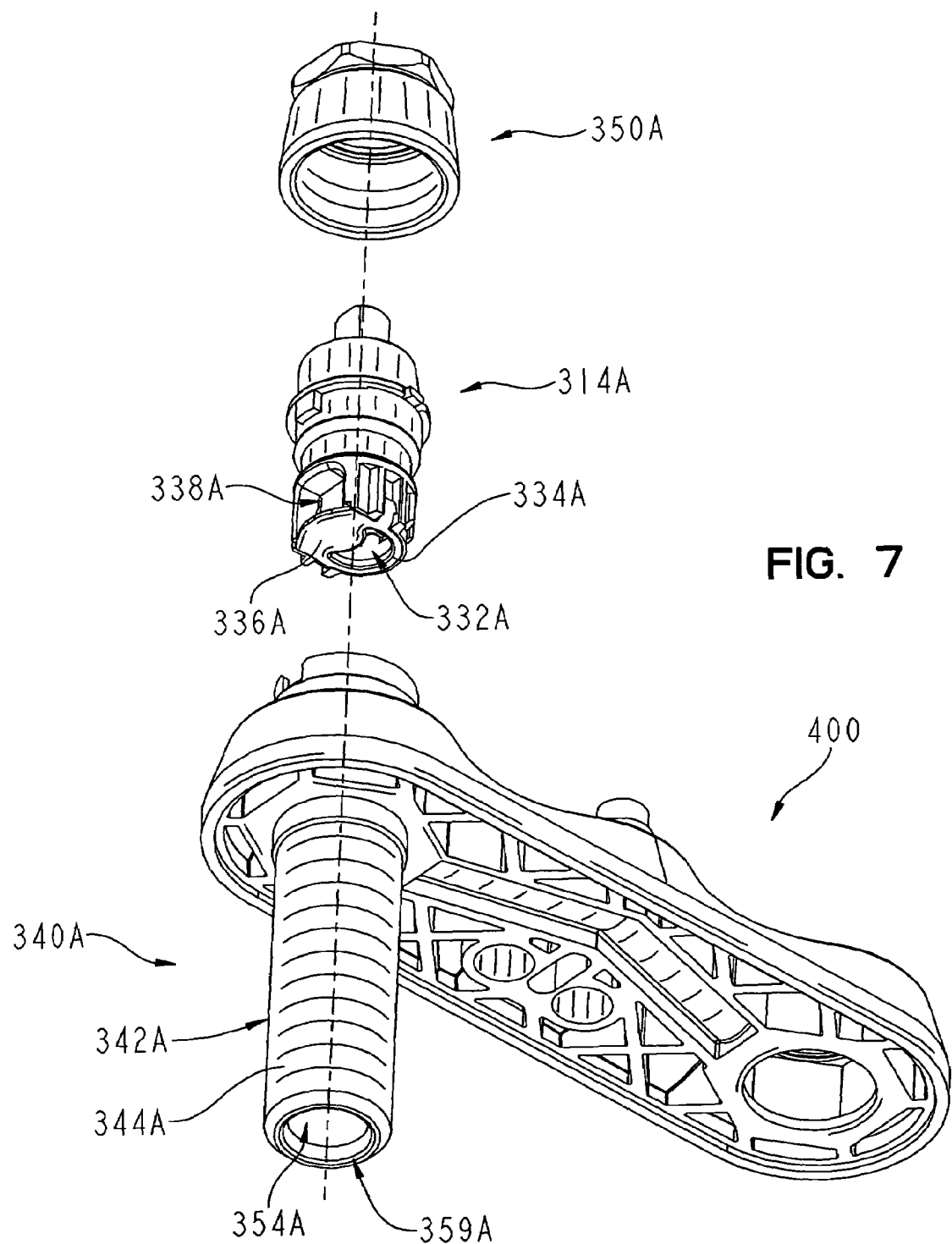
FIG. 7 is a lower perspective view of a portion of the lower assembly with a valve assembly exploded.

Referring to FIG. 7, valve cartridge 314A is shown. Valve cartridge 314A includes an internal waterway 330A (see FIG. 5) which has a fluid inlet 332A formed as an opening 334A in a plate 336A and a fluid outlet 338A. Referring to FIG. 5, valve 310 is housed in a valve body 340A. Valve body 340A includes a lower portion 342A having a threaded external wall 344A configured to threadably mate with an upstream waterway component (not shown). Valve body 340A further includes an upper portion 346A having a threaded external wall 348A. Valve 310 is positioned within an internal cavity 352A of valve body 340A and held in place with a coupler 350A, illustratively a bonnet nut.

Valve body 340A includes an internal waterway 354A having a first portion 356A, a second portion 358A, and a third portion 360A. In the absence of blockage by valve 310 water enters internal waterway 354A from an upstream waterway (not shown) at fluid inlet 359A, travels generally vertically through first portion 356A and second portion 358A, then generally horizontally through third portion 360A, and out fluid outlet 361A to a downstream waterway component, illustratively waterway component 370.

Seal assembly 316A is positioned generally within second portion 358A of waterway 354A and valve cartridge 314A is positioned in third portion 360A of waterway 354A. Spring 322A biases seat 324A upward such that seat 324A presses against plate 336A (see FIG. 7) to prevent water from leaking between seat 324A and plate 336A. Once valve 310 is positioned in valve body 340A, bonnet nut 350A is threaded onto upper portion 346A of valve body 340A to hold valve 310 in place. In operation, when valve 310 is open, water passes generally vertically through first portion 356A of waterway 354A, generally vertically through a waterway 362A of seat 324A (which is positioned in second portion 358A of waterway 354A), generally vertically into fluid channel 338A of valve cartridge 314A (which is positioned in third portion 360A of waterway 354A), generally horizontally in fluid channel 338A of valve cartridge 314A and out fluid outlet 361A. When valve 310 is closed, plate 336A is rotated (due to the rotation of cartridge 314A) such that opening 334A is not aligned with fluid channel 362A in seat 324A. As such, water is prevented from entering fluid channel 338A of valve cartridge 314A. Further, due to the force of spring 322A water may not leak between seat 324A and plate 336A.

Figure 9:
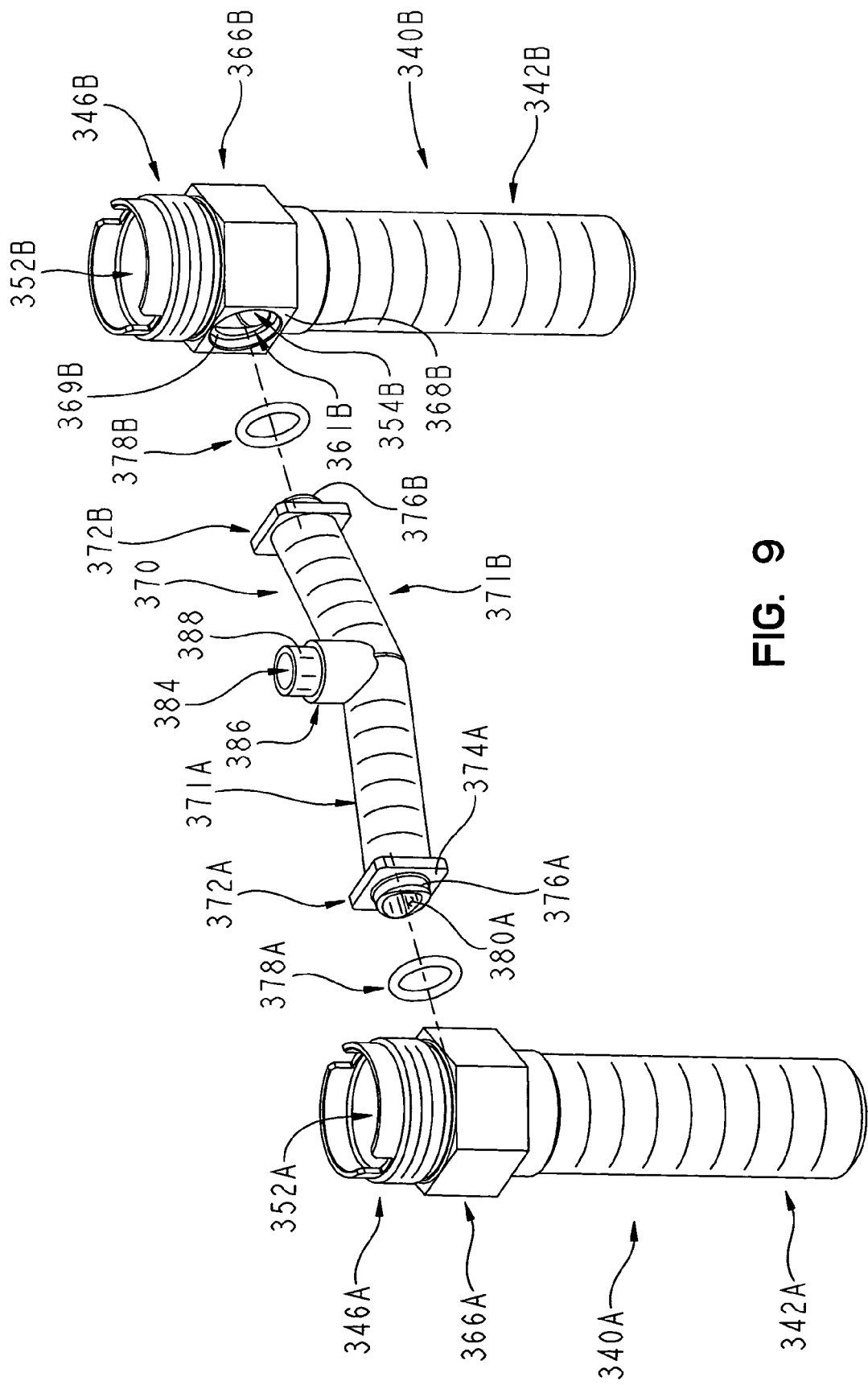
FIG. 9 is an exploded view of a hot water valve body, a cold water valve body, and a waterway component.

Referring to FIG. 9, fluid outlet 361 (361B shown) is coupled to a fluid inlet 380 (380A is shown) of a waterway component 370. Fluid outlet is 361 is positioned in portion 366A, 366B of valve bodies 340A, 340B which are illustratively shown as being generally hex-shaped with a flat surface 368 (368B shown) providing fluid outlet 361.

Waterway component 370 includes two generally tubular portions 371A, 371B each having an internal waterway 382A, 382B and each configured to mate with valve bodies 340A, 350B respectively. Portions 371A, 371B are generally shown to be arranged in a V-shaped arrangement. This arrangement is to provide clearance for a drain assembly (not shown) of faucet 300 as explained below. In other embodiments, portions 371A, 371B may be generally co-linear. Further waterway component 370 may be comprised of multiple waterway components which are coupled together by an overmold component 400.

Each portion 371A, 371B includes a flange 372A, 372B and a seal surface 376A, 376B. A seal 378A, 378B is positioned over seal surface 376A, 376B and rests against surface 374 (374A shown) of flanges 372A, 372B. Seals 378A, 378B also rest against a seal surface 369 (369B shown) of valve bodies 340A, 340B when valve bodies 340A, 340B are coupled to waterway component 370. Although the positioning of seal 374A, 374B may hold valve bodies 340A, 340B and waterway component 370 together absent an external force and/or fluid flowing through the respective valve bodies 340A, 340B and waterway component 370, additional coupling is required.

Waterway component 370 further includes an upright portion 386 having a waterway 384. Upright portion 386 includes a reduced portion 388 which is configured to be coupled to a downstream waterway 440 (see FIG. 3) illustratively shown within a spout 442 (see FIG. 3). As such, assuming both valves 310, 312 are open, hot water from valve body 340A enters first portion 371A of waterway component 370 and cold water from valve body 340B enters second portion 371B of waterway component 370. The hot water and cold water are combined in waterway component 370 and flow through upright portion 386 into downstream waterway 440 and out of fluid outlet 444.

Referring back to FIG. 3, an overmold coupler 400 is shown. Overmold coupler 400 is made by molding a thermoplastic material around portions of valve body 340A, valve body 340B, and waterway component 370. Exemplary thermoplastic materials include glass reinforced polypropylene. Overmold coupler 400 surrounds flanges 374A, 374B of waterway component 370 and portions 366A, 366B of valve bodies 340A, 340B, respectively. As best shown in FIG. 5, the presence of overmold material behind flanges 374A, 374B assists in preventing waterway component 370 from moving relative to either of valve bodies 340A, 340B which would have been possible in the absence of overmold coupler 400.

Overmold component 400 assists in maintaining a fluid tight seal between valve bodies 340A, 340B, and waterway component 370 by holding the respective components together.

Since overmold coupler 400 couples valve bodies 340A, 340B and waterway component 370 together without the need for brazing, valve bodies 340A, 340B and waterway component 370 may be made from dissimilar materials and non-metallic materials. In one embodiment, valve bodies 340A, 340B are machined from brass stock and waterway component 370 is made from a thermoplastic material through an injection molding operation. In another embodiment, valve bodies 340A, 340B are made from a brass sleeve wherein the internal structure such as second portion 358A, 358B which holds seal assembly 316A, 316B and seat surface 369 of fluid outlet 361A, 361B are made from a thermoplastic material through an injection molding operation.

Figure 8:
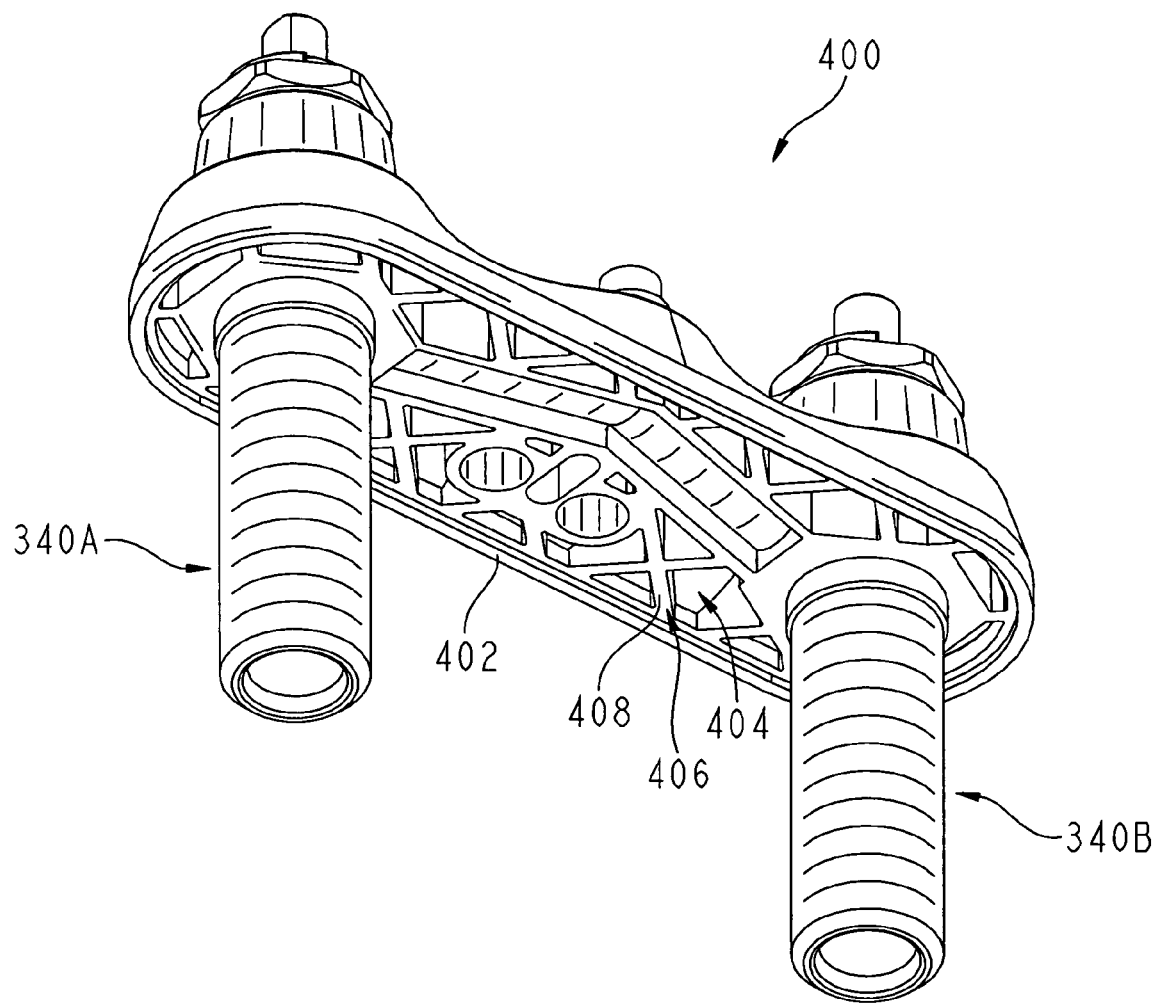
FIG. 8 is a lower perspective view of the lower assembly.

In addition to coupling valve bodies 340A, 340B, and waterway component 370 together, overmold coupler 400 in the illustrated embodiment may function as a mounting component as well. Referring to FIG. 8, a lower surface 402 of overmold coupler 400 provides a flat surface for laying flush relative to a top surface of a sink (not shown). In one embodiment, a gasket (not shown) is positioned between lower surface 402 and the top surface of the sink. Further, in one embodiment, overmold coupler 400 may be configured to receive a coupler or cam fastener configured to couple faucet 300 to the sink mounting deck (not shown) as shown in U.S. patent application Ser. No. 11/214,241, filed concurrently herewith, titled "Overhead Cam Faucet Mounting System," the disclosure of which is expressly incorporated by reference herein.

Figure 4:
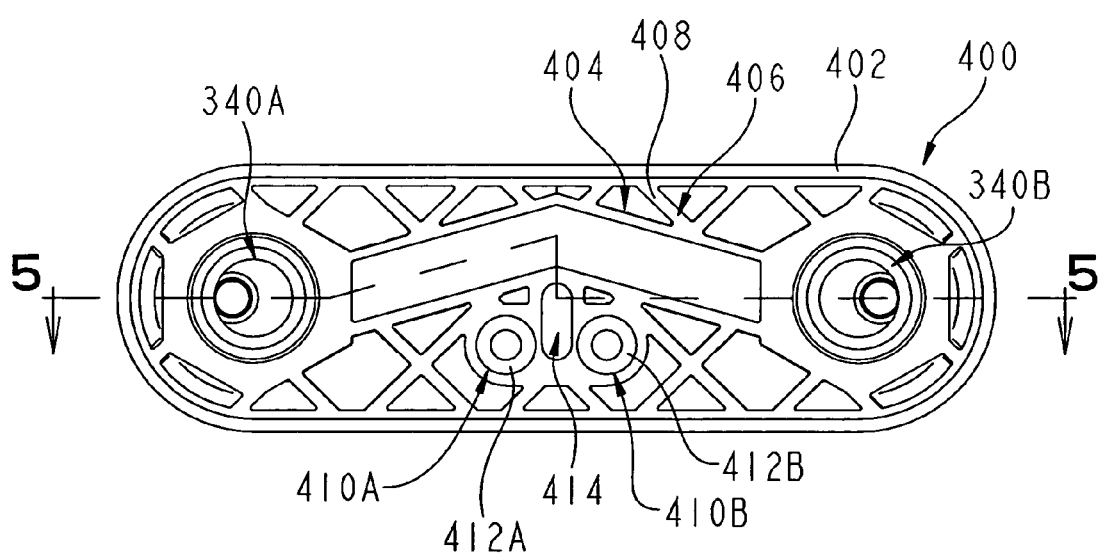
FIG. 4 is a bottom view of the lower assembly of FIG. 3.

Referring to FIG. 4, overmold coupler 400 further includes mounting apertures 410A, 410B each having an associated seat surface 412A, 412B. Mounting apertures 410A, 410B each receive a coupler (not shown) which is received in a mounting aperture (not shown) of spout 442 (see FIG. 3). In one embodiment, the couplers are bolts whose heads press against seat surfaces 412A, 412B to hold spout 442 relative to overmold coupler 400. Further shown in FIG. 4, is an aperture 414 which is sized to receive a lift rod of a pop-up drain assembly (not shown) which couples a knob/handle 432 (see FIG. 3) to a drain plug (not shown) in the sink.

As seen in FIG. 8, the mold which creates overmold coupler 400 includes core out portions (a first one illustrated as 404) which provides ribs (a first one illustrated as 406) as well as reducing the amount of material required to make overmold coupler 400 which aids in maintaining the shape of overmold coupling 400 as it cools. As shown, in FIG. 8, a top surface 408 of ribs 406 is offset inward relative to lower surface 402 of overmold coupler 400. Ribs 406 provide additional structural rigidity to overmold coupler 400.

In one embodiment, overmold coupler 400 is manufactured by placing waterway component 370, valve body 340A, valve body 340B, and seals 378A, 378B in a mold (not shown) as inserts. It is well known in the injection molding art to mold a thermoplastic material around one or more inserts positioned in the mold.

The components are either individually placed or placed as an assembly. In either case, the components are assembled such that seal 378A is generally contacting surface 369A of valve body 340A and surface 374A of waterway component 370 and such that seal 378B is generally contacting surface 369B of valve body 340B and surface 374B of waterway component 370. Once the mold is closed the thermoplastic material is injected into the mold which is configured to form the overmold coupler shown in FIGS. 3-8. As such, overmold coupler 400 is spaced apart for the fluid transported in fluid waterway created by valve body 340A, valve body 340B, and waterway component 370. It should be understood that although overmold coupler 400 is shown as a separate component in FIG. 6, it is not a separate component that is assembled to the other components, but rather a molded component which is formed over various portions of valve body 340A, valve body 340B, and waterway component 370 by a molding operation.

In one embodiment, referring to FIG. 5, the mold shuts off against surface 390A, 390B of lower portion 354A, 354B of valve bodies 340A, 340B, against side surfaces 392A, 392B of bonnet nuts 352A, 352B, and against surface 394 of waterway component 370. As such, in one embodiment, valves 310, 312 may be assembled into their respective valve bodies 340A, 340B with bonnet nuts 352A, 352B secured thereto prior to overmold coupler 400 being formed. In another embodiment, the mold may shut off against a top surface 397A, 397B and a bottom surface 399A, 399B of portions 366A, 366B of valve bodies 340A, 340B. The overall diameter of portions 366A, 366B may be increased, as necessary, for top surface 397A, 397B and bottom surface 399A, 399B to provide a sealing surface for the mold.

In one embodiment, waterway component 370 is connected to waterway component 440 through conventional couplers. In another embodiment, similar to overmold components 134 and 234, overmold component 400 may include additional connections such as between waterway connector 370 and waterway component 440 and/or various upstream waterway components (not shown).

Although the invention has been described in detail with reference to certain preferred embodiments, variations and modifications exist within the spirit and scope of the invention as described and defined in the following claims.

The invention claimed is:

1. A faucet for connection to a water supply having a hot water supply and a cold water supply, the faucet comprising:
    a hot water inlet member having a hot water fluid inlet adapted to be coupled to the hot water supply, a hot water fluid outlet, and an internal waterway connecting the hot water fluid inlet to the hot water fluid outlet;
    a cold water inlet member having a cold water fluid inlet adapted to be coupled to the cold water supply, a cold water fluid outlet and an internal waterway connecting the cold water fluid inlet to the cold water fluid outlet;
    a waterway component having a first fluid inlet, a second fluid inlet, a fluid outlet and an internal waterway connecting the first fluid inlet, the second fluid inlet, and the fluid outlet; and
    at least one coupler configured to alone maintain the position of the hot water inlet member relative to the waterway component when in use with a pressurized fluid and to alone maintain the position of the cold water inlet member relative to the waterway component when in use with a pressurized fluid, the at least one coupler being an overmold of at least a first portion of the hot water inlet member, a first portion of the cold water inlet member, and a first portion of the waterway component, the at least one coupler coupling the hot water inlet member and the waterway component such that the internal waterway of the hot water inlet member is in fluid communication with the internal waterway of the waterway component and such that the at least one coupler is prevented from contacting the fluid passing through the internal waterway of the hot water inlet member and the internal waterway of the waterway component and coupling the cold water inlet member and the waterway component such that the internal waterway of the cold water inlet member is in fluid communication with the internal waterway of the waterway component and such that the at least one coupler is prevented from contacting the fluid passing through the internal waterway of the cold water inlet member and the internal waterway of the waterway component.

2. The faucet of claim 1, wherein the at least one coupler includes a first overmold coupler which couples the hot water inlet member to the waterway component and a second overmold coupler which couples the cold water inlet member to the waterway component.

3. The faucet of claim 2, wherein the first overmold coupler and the second overmold coupler are made from a glass reinforced polypropylene.

4. The faucet of claim 1, wherein the at least one coupler includes a first overmold coupler which couples the hot water inlet member to the waterway component and the cold water inlet member to the waterway component.

5. The faucet of claim 4, wherein the first overmold coupler is made from a glass reinforced polypropylene.

6. The faucet of claim 4, further comprising a hot water upstream waterway coupled to the hot water inlet member, the hot water upstream waterway being positioned downstream from the hot water supply and upstream to the hot water inlet member, wherein the first overmold coupler further couples the hot water inlet member to the hot water upstream waterway.

7. The faucet of claim 4, further comprising a cold water upstream waterway coupled to the cold water inlet member, the cold water upstream waterway being positioned downstream from the cold water supply and upstream to the cold water inlet member, wherein the first overmold coupler further couples the cold water inlet member to the cold water upstream waterway.

8. The faucet of claim 4, further comprising an escutcheon covering the at least one coupler and a downstream waterway coupled to the fluid outlet of the waterway component, the downstream waterway extending above a top surface of the escutcheon.

9. The faucet of claim 8, wherein the first overmold coupler further couples the waterway component and the downstream waterway.

10. The faucet of claim 9, wherein each of the hot water inlet member and the cold water inlet member transport the respective hot water and cold water in a generally vertical direction followed by a generally horizontal direction, wherein the waterway component transports the respective hot water and cold water in a generally horizontal direction followed by a generally vertical direction.

11. The faucet of claim 1, further comprising a first user input device configured to control a flow rate of hot water exiting the fluid outlet of the hot water inlet member, the first user input device being positioned above the at least one coupler, and a second user input device configured to control a flow rate of cold water exiting the fluid outlet of the cold water inlet member, the second user input device being positioned above the at least one coupler.

12. The faucet of claim 11, wherein the first user input device is a first handle coupled to a rotatable valve positioned within the hot water inlet member and the second user input device is a second handle coupled to a rotatable valve positioned within the cold water inlet member.

13. The faucet of claim 4, further comprising a hot water upstream waterway coupled to the hot water inlet member, the hot water upstream waterway being positioned downstream from the hot water supply and upstream to the hot water inlet member and a cold water upstream waterway coupled to the cold water inlet member, the cold water upstream waterway being positioned downstream from the cold water supply and upstream to the cold water inlet member, wherein the first overmold coupler further couples the hot water inlet member to the hot water upstream waterway and the cold water inlet member to the cold water upstream waterway.

14. A faucet, comprising:
a first waterway component of the faucet having an internal waterway;
a second waterway component of the faucet having an internal waterway, the second component being positioned such that the internal waterway of the second waterway component is in fluid communication with the internal waterway of the first waterway component;
a valve positioned within the first waterway component to control the flow rate of fluid through the first waterway component;
a user input device coupled to the valve; and
a coupler configured to alone maintain the position of the second waterway component relative to the first waterway component when in use with a pressurized fluid, the coupler being an overmold of at least a first portion of the first waterway component and a first portion of the second waterway component, wherein the coupler is spaced apart from the fluid being communicated by the internal waterways of the first waterway component and the second waterway component such that the coupler is prevented from contacting the fluid passing through the internal waterway of the first waterway component and the internal waterway of the second waterway component and wherein the user input device is external relative to the coupler.

15. The fluid delivery system of claim 14, wherein the coupler is made of a glass reinforced polypropylene.

16. The fluid delivery system of claim 14, wherein a seal is positioned between the first waterway component and the second waterway component.

17. The fluid delivery system of claim 14, wherein the first waterway component and the second waterway component are housed in an escutcheon and the first user input device extends above the escutcheon.

18. A method of assembling a faucet, the method comprising the steps of:
providing a first waterway component of the faucet having an internal waterway and a second waterway component of the faucet having an internal waterway;
positioning the first waterway component and the second waterway component in a mold such that a fluid outlet of the internal waterway of the first waterway component is generally positioned proximate to a fluid inlet of the second waterway component; and
molding a coupler over at least a portion of the first waterway component and at least a portion of the second waterway component to couple the second waterway component to the first waterway component and to alone maintain the position of the second waterway component relative to the first waterway component when in use with a pressurized fluid, wherein the internal waterway of the first waterway component and the internal waterway of the second waterway component are in fluid communication and the coupler is spaced apart from the internal waterway of the first waterway component and the internal waterway of the second waterway component such that the coupler is prevented from contacting the fluid passing through the internal waterway of the first waterway component and the internal waterway of the second waterway component.

19. A method of assembling a faucet, the method comprising the steps of:
providing a first waterway component of the faucet having an internal waterway and a second waterway component of the faucet having an internal waterway;
positioning the first waterway component and the second waterway component in a mold such that a fluid outlet of the internal waterway of the first waterway component is generally positioned proximate to a fluid inlet of the second waterway component; and
molding a coupler over at least a portion of the first waterway component and at least a portion of the second waterway component to couple the second waterway component to the first waterway component and to maintain the position of the second waterway component to the first waterway component, wherein the internal waterway of the first waterway component and the internal waterway of the second waterway component are in fluid communication and the coupler is spaced apart from the internal waterway of the first waterway component and the second waterway component; and
positioning a valve within the first waterway component, the valve being configured to control the flow rate of fluid through the internal waterway of the first waterway component, the valve being positioned within the first waterway component prior to the step of molding a coupler.

20. The method of claim 19, further comprising the steps of:
placing an escutcheon over the coupler; and
coupling a first user input device to the valve, the first user input device being located above the escutcheon.

21. The faucet of claim 1, wherein the at least one coupler is made from a thermoplastic material.

22. The faucet of claim 14, wherein the coupler is made from a thermoplastic material.

23. The faucet of claim 14, wherein the first waterway component and the second waterway component may be moved relative to each other absent the presence of the coupler.

24. The method of claim 18, wherein the at least one coupler is made from a thermoplastic material.

25. The method of claim 18, wherein the first waterway component and the second waterway component may be moved relative to each other absent the presence of the coupler.

* * * * *